(12) United States Patent
Allen et al.

(10) Patent No.: US 6,196,768 B1
(45) Date of Patent: Mar. 6, 2001

(54) SPAR FAIRING

(75) Inventors: Donald Wayne Allen, Katy; Dean Leroy Henning, Needville, both of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/970,629

(22) Filed: Nov. 14, 1997

Related U.S. Application Data

(60) Provisional application No. 60/031,268, filed on Nov. 15, 1996.

(51) Int. Cl.[7] .................................................... B63B 35/44
(52) U.S. Cl. .......................................... 405/224; 405/195.1
(58) Field of Search ........................... 405/211, 216, 405/223.1, 224; 114/243

(56) References Cited

U.S. PATENT DOCUMENTS

| | | | |
|---|---|---|---|
| 3,410,096 | * 11/1968 | Schuh | 114/243 |
| 3,717,113 | * 2/1973 | Wilde | 114/243 |
| 4,389,487 | 6/1983 | Ries | 435/273 |
| 4,398,487 | * 8/1983 | Ortloff et al. | 114/243 |
| 4,505,618 | * 3/1985 | Yashima | 405/211 |
| 4,656,959 | 4/1987 | Mosidon | 114/56 |
| 4,702,321 | 10/1987 | Horton | 166/350 |
| 4,906,139 | * 3/1990 | Chiu et al. | 405/223.1 |
| 5,410,979 | 5/1995 | Allen et al. | 114/243 |

FOREIGN PATENT DOCUMENTS

| | | |
|---|---|---|
| 2118903 | 11/1983 | (GB) . |
| 2310832 | 9/1997 | (GB) . |

* cited by examiner

*Primary Examiner*—David Bagnell
*Assistant Examiner*—Frederick L. Lagman

(57) ABSTRACT

An improved spar for offshore hydrocarbon recovery operations is disclosed having a vertically oriented elongated floating hull with a buoyant upper section and a ballasted lower section and an anchoring system connecting the hull to the ocean floor. The hull of the spar is provided with a vertically oriented, rotatable fairing whereby low drag VIV suppression protects the spar.

33 Claims, 2 Drawing Sheets

SPAR FAIRING

RELATED APPLICATIONS

This application claims priority to provisional application No. 60/031,268 filed Nov. 15, 1996.

BACKGROUND OF THE INVENTION

The present invention relates to a heave resistant, deep-water platform supporting structure known as a "spar." More particularly, the present invention relates to reducing the susceptibility of spars to vortex induced vibrations ("VIV").

Efforts to economically develop offshore oil and gas fields in ever deeper water create many unique engineering challenges. One of these challenges is providing a suitable surface accessible structure. Spars provide a promising answer for meeting these challenges. Spar designs provide a heave resistant, floating structure characterized by an elongated, vertically disposed hull. Most often this hull is cylindrical, buoyant at the top and with ballast at the base. The hull is anchored to the ocean floor through risers, tethers, and/or mooring lines.

Though resistant to heave, spars are not immune from the rigors of the offshore environment. The typical single column profile of the hull is particularly susceptible to VIV problems in the presence of a passing current. These currents cause vortexes to shed from the sides of the hull, inducing vibrations that can hinder normal drilling and/or production operations and lead to the failure of the anchoring members or other critical structural elements.

Helical strakes and shrouds have been used or proposed for such applications to reduce vortex induced vibrations. Strakes and shrouds can be made to be effective regardless of the orientation of the current to the marine element. But shrouds and shakes materially increase the drag on such large marine elements.

Thus, there is a clear need for a low drag, VIV reducing system suitable for deployment in protecting the hull of a spar type offshore structure.

SUMMARY OF THE INVENTION

Toward providing these and other advantages, the present invention is an improved spar for offshore hydrocarbon recovery operations having a vertically oriented elongated floating hull with a buoyant upper section and a ballasted lower section and an anchoring system connecting the hull to the ocean floor. The hull of the spar is provided with a vertically oriented, rotatable fairing whereby low drag VIV suppression protects the spar.

BRIEF DESCRIPTION OF THE DRAWINGS

The brief description above, as well as further advantages of the present invention will be more fully appreciated by reference to the following detailed description of the illustrated embodiments which should be read in conjunction with the accompanying drawings in which.

DETAILED DESCRIPTION OF ILLUSTRATIVE EMBODIMENTS

Figure 1:
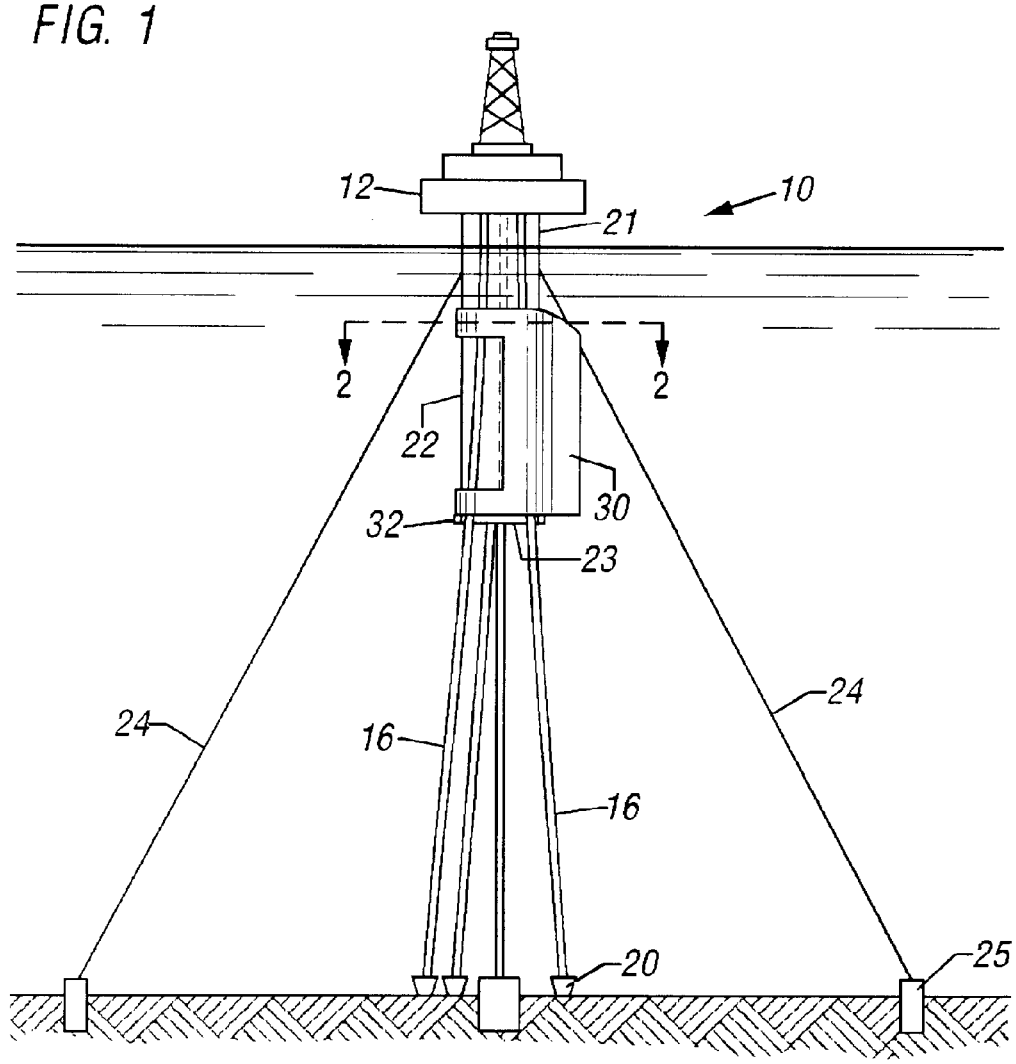
FIG. 1 is a side elevational view of a faired spar in accordance with one embodiment of the present invention.

FIG. 1 illustrates the environment of the present invention. Here spar 10 presents a deck 12 above ocean surface 14. Spars are a broad class of floating, moored offshore structure characterized in that they are resistant to heave motions and present an elongated, vertically oriented hull 22 which is buoyant at the top 21 and is ballasted at its base 23. Such spars may be deployed in a variety of sizes and configuration suited to their intended purpose ranging from drilling alone, drilling and production, or production alone.

A plurality of risers 16 extend from the deck to the ocean floor 18 at wells 20 to conduct well fluids. Deck 12 is supported at the top of spar hull 22. The hull is elongated and vertically oriented with a buoyant top section and a ballasted lower section. A plurality of mooring lines 24 are connected to a spread of anchors 25 set in the ocean floor to help hold spar 10 in place over wells 20. In other embodiments, the risers may act alone as tethers to form the anchoring system securing hull 22 in place while providing conduits for conducting produced oil and gas. The upper end of risers 16 are connected to production facilities supported by deck 12 and, after initial treatment, the hydrocarbons are directed through an export riser to a subsea pipeline, not shown.

Figure 2:
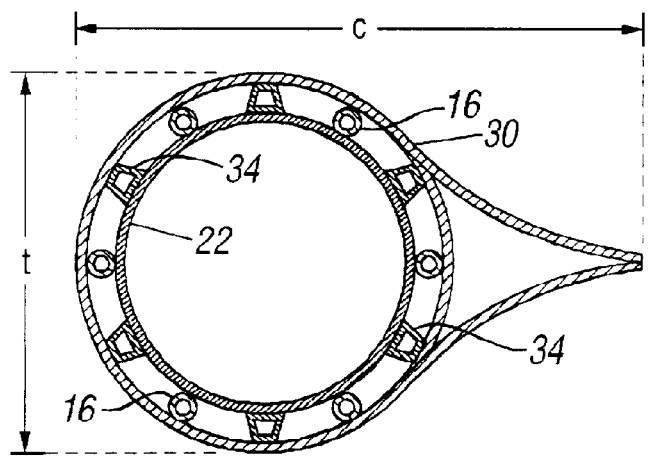
FIG. 2 is a cross sectional view of the faired spar of FIG. 1, taken at line 2—2 of FIG. 1.

FIGS. 1 and 2 illustrate an embodiment of a production spar, but appropriately adapted spar configurations are suitable for drilling operations or for combined drilling and production operations as well in the development of offshore hydrocarbon reserves. A basic characteristic of spar type structures is their heave resistance. However, the typical elongated, usually cylindrical hull or caisson 22 is very susceptible to vortex induced vibration ("VIV") in the presence of a passing current. These currents cause vortexes to shed from the sides of the hull 22, inducing vibrations that can hinder normal drilling and/or production operations and lead to the failure of the risers, mooring line connections or other critical structural elements. Premature fatigue failure is a particular concern.

Prior efforts at suppressing VIV in spar hulls have centered on strakes and shrouds. However both of these efforts have tended to produce structures with having high drag coefficients, rendering the hull more susceptible to drift. This commits substantial increases in the robustness required in the anchoring system. Further, this is a substantial expense for structures that may have multiple elements extending from near the surface to the ocean floor and which are typically considered for water depths in excess of half a mile or so.

Failings can provide low drag VIV suppression for cylindrical members. However, these have been best suited for relatively small diameter elements such as offshore risers. For a number of reasons, fairings have not been thought applicable to large marine elements. One reason is the correlation of the need for effective VIV suppression to Reynolds number. The Reynolds number for a stationary cylinder within a fluid moving perpendicular to the axis of the cylinder is approximated with the following expression:

$$Re = VD/v$$

where:

Re is the Reynolds number;

V is the current velocity;

D is the outside diameter; and v is the kinematic viscosity

Thus, in a given medium, here seawater, the Reynolds number is proportional to the velocity time the diameter and the hull of a spar is several orders of magnitude greater in diameter than typical risers where fairings have been thought appropriate. Typical of prior applications are offshore production risers designed on the basis of Reynolds numbers on the order of 50K to 100K and drilling risers at one to two million are pushing it. By contrast, spar structures would anticipate Reynolds numbers on the order of five to fifty million, and perhaps more, depending upon the size and configuration.

Further, it has been common wisdom that the well correlated vortex shedding along a cylinder exhibited at high Reynolds numbers would require that effective VIV suppression also address reducing spanwise correlation. However, conventional fairings are not the choice in applications defined with in this manner when compared with helical strakes or shrouds which disturb such correlation spanwise as a natural side effect of breaking up the correlation of transversely passing seawater. In addition, it has been the conventional wisdom that changes in attack angle of environmental current to a fixed fairing would both limit the effectiveness in vortex shedding and subject the tail of the fairing to significant rotational loads and increased drag. Thus, fairings in general and fixed fairings in particular have been thought inapplicable to solve VIV problems for spar hulls.

However, recent high Reynolds number testing shows this is not the case and a spar in accordance with the present invention provides a vertically oriented, rotatable failing 30 presented on the hull. The fairing need not necessarily extend all the way the surface, nor necessarily to the bottom of the hull. Further, multiple fairings may be deployed.

FIG. 2 illustrates the important chord "c" and thickness "t" dimensions of fairing 30. "Short fairings," as used herein, are defined as having a chord to thickness ratio between about 1.50 and 1.20 and "ultra-short fairings" are those between about 1.20 and 1.10. The surprising effectiveness of such short and ultrashort fairings has recently been demonstrated in stark contrast to the conventional wisdom requiting a much greater ratio. Short fairings are disclosed in U.S. Pat. No. 5,410,979, the disclosure thereof being hereby incorporated by reference. Ultrashort fairings are disclosed in the contemporaneously filed U.S. provisional patent application 60/031,271 by D. W. Allen and D. L. Henning for Ultrashort Fairings for Suppressing Vortex-Induced-Vibration. The disclosure of this later document is also hereby incorporated by reference.

Any detriments in an asymmetrical arranged mass, effective mass, or loading can be minimized by employing a short fairing or an ultrashort fairing in combination with a selection of materials or buoyancy accommodations to render the fairing nearly neutrally buoyant. If there is a net weight in submerged fairing 30, an upwardly facing load collar 32 is attached to hull 22 and presents a stop, preferably fitted with low friction surface, which engages the bottom of fairing 30. Note too that an ultrashort fairing configuration maximizes the effectiveness of the fairing for VIV suppression and minimizes drag increases should changes in current orientation fail to overcome resistance to reorient fairing 30.

In the production spar embodiment of FIGS. 1 and 2, production, import and export risers, collectively noted as risers 16, pass exteriorly down the sides of hull 22. Fairing bushings 34 are mounted on the hull and project outwardly therefrom the slidingly engage the fairing and prevent contact between the fairing and the risers.

Figure 3:
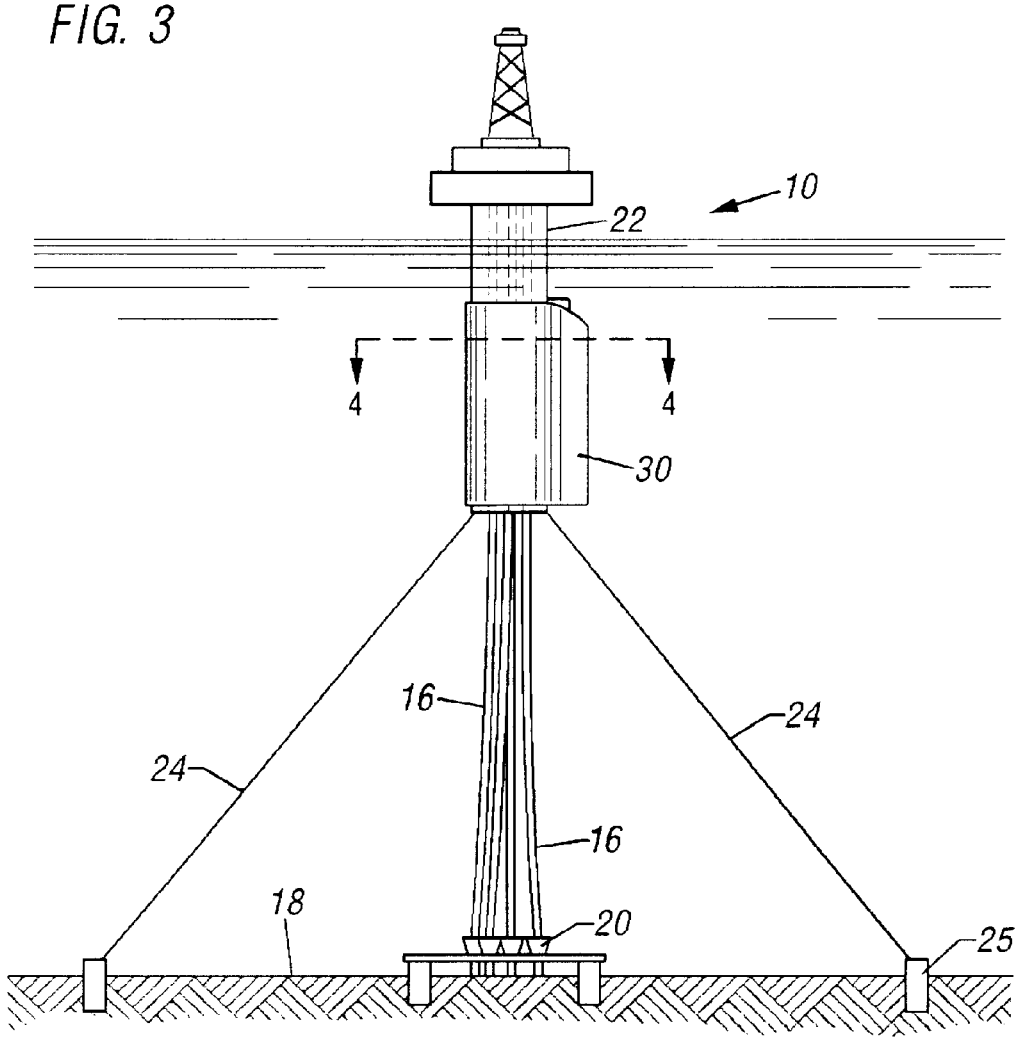
FIG. 3 is a side elevational view of a faired spar in accordance with another embodiment of the present invention.
Figure 4:
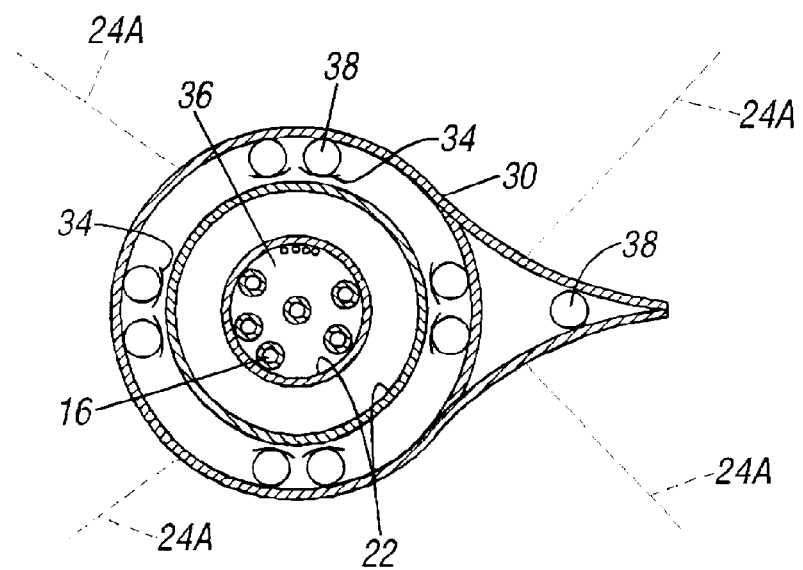
FIG. 4 is a cross sectional view of the faired spar of FIG. 3, taken at line 4—4 of FIG. 3.

By contrast, the drilling and production spar of FIGS. 3 and 4 provides a central moon pool 36 within hull 22. In this embodiment, all the risers are run through the moon pool with the production risers mounted peripherally as they are completed, as are any export risers tying production to a pipeline system, not shown. Drilling and/or work overs proceed through a central drilling riser.

This spar configuration provides a relatively smooth exterior for hull 22 without import or export riser that need to be protected from contact with fairing 30. This permits buoyancy cans 38 to be mounted within the interior of the fairing. Preferably the buoyancy cans are provided with a low friction bearing surface or bushing 34 inboard, toward the spar hull. If a net buoyant force is provided to submerged fairing 30, a downwardly facing thrust or load collar 32 may be mounted on the hull to act as a stop for the fairing and as a bushing surface for its rotation. Here lateral mooring lines 24 are illustrated connected to spar hull 22 below fairing 30.

An optional alternative set of mooring lines 24A are illustrated in dotted outline in FIG. 4. These attach directly to fairing 30 in an asymmetrical manner. These fairings provide a spring response to reorientation of the fairing. Where substantial rotation is desired, the mooring lines may be played out and taken in to accommodate this rotation. This provides a hybrid response, a "soft fixed" fairing that may be allowed to rotate without transmitting the rotation to the spar hull and thereby causing the risers to twist relative to their securement at well heads 20 at ocean floor 18.

The fairings of the present invention can be used with other VIV suppression and drag reduction facilities on the risers, mooring lines, or on the spar hull. For instance, fixed fairings may be provided on portions of the hull with intermediary fairings which are allowed to rotate freely.

Other modifications, changes and substitutions are intended in the foregoing disclosure and in some instances some features of the invention win be employed without a corresponding use of other features. Accordingly, it is appropriate that the appended claims be construed broadly and in the manner consistent with the spirit and scope of the invention herein.

What is claimed is:

1. In a spar structure for offshore hydrocarbon recovery operations comprising:
   a vertically oriented elongated floating hull, comprising:
      a buoyant upper section; and
      a ballasted lower section;
   a vertically oriented fairing rotatably mounted about the floating hull; and
   an anchoring system connecting the hull to the ocean floor.

2. A spar structure in accordance with claim 1 wherein the fairing is a short fairing having a chord to thickness ratio between about 1.5 and 1.20.

3. A spar structure in accordance with claim 1 wherein the fairing is an ultra-short fairing having a chord to thickness ratio between about 1.20 and 1.10.

4. A spar structure in accordance with claim 1 wherein the fairing is substantially neutrally buoyant.

5. A spar structure in accordance with claim 1 wherein the fairing has a net positive buoyancy and further comprising a downwardly directed load shoulder connected circumferentially about the hull directly above the fairing.

6. A spar structure in accordance with claim 5 wherein the anchoring system comprises a plurality of lateral mooring lines radiating out from the hull from attachment points below the fairing.

7. A spar structure in accordance with claim 1 wherein the fairing has a net negative buoyancy and further comprising an upwardly directed load shoulder connected circumferentially about the hull directly below the fairing.

8. A spar structure in accordance with claim 7 wherein the anchoring system comprises a plurality of lateral mooring lines radiating out from the hull from attachment points above the fairing.

9. A spar structure in accordance with claim 1 wherein the anchor system comprises:
   a foundation secured to the ocean floor; and
   vertically extending risers connecting the hull to the foundation.

10. A spar structure in accordance with claim 9 wherein the risers extend along the exterior of the hull, further comprising a plurality of fairing bushings connected to the hull and projecting outwardly to engage the fairing and prevent contact between the fairing and the risers.

11. A spar structure in accordance with claim 9 wherein the hull of the spar defines a moon pool and the risers extend downwardly from within the moon pool, and further comprising a plurality of low friction pad mounted on the interior of the fairing.

12. A spar structure in accordance with claim 1 wherein the anchoring system comprises a plurality of lateral mooring lines, with some of the lateral mooring lines connect to the fairing in a manner asymmetrical to the axis of the fairing whereby the orientation of the fairing may be aligned with shifting currents independent of rotation of the spar hull.

13. In a spar structure for offshore hydrocarbon recovery operations comprising:
  a vertically oriented elongated floating hull, comprising:
    a buoyant upper section; and
    a ballasted lower section;
  a vertically oriented fairing rotatably mounted about the floating hull; and
  an anchoring system connecting the hull to the ocean floor, comprising:
    a foundation secured to the ocean floor; and
    vertically extending risers connecting the bull to the foundation, extending along the exterior of the hull; and
  a plurality of fairing bushings connected to the hull and projecting outwardly to engage the fairing and prevent contact between the fairing and the risers.

14. A spar structure in accordance with claim 13 wherein the fairing is a short fairing having a chord to thickness ratio between about 1.5 and 1.20.

15. A spar structure in accordance with claim 13 wherein the fairing is an ultra-short fairing having a chord to thickness ratio between about 1.20 and 1.10.

16. A spar structure in accordance with claim 13 wherein the fairing is substantially neutrally buoyant.

17. A spar structure in accordance with claim 13 wherein the fairing has a net positive buoyancy and further comprising a downwardly directed load shoulder connected circumferentially about the hull directly above the fairing.

18. A spar structure in accordance with claim 17 wherein the anchoring system comprises a plurality of lateral mooring lines radiating out from the hull from attachment points below the fairing.

19. A spar structure in accordance with claim 13 wherein the fairing has a net negative buoyancy and further comprising an upwardly directed load shoulder connected circumferentially about the hull directly below the fairing.

20. A spar structure in accordance with claim 13 wherein the anchoring system comprises a plurality of lateral mooring lines radiating out from the hull from attachment points above the fairing.

21. A spar structure in accordance with claim 13 wherein the hull of the spar defines a moon pool and the risers extend downwardly from within the moon pool, and further comprising a plurality of low friction pad mounted on the interior of the fairing.

22. A spar structure in accordance with claim 13 wherein the anchoring system comprises a plurality of lateral mooring lines, with some of the lateral mooring lines connect to the fairing in a manner asymmetrical to the axis of the fairing whereby the orientation of the fairing may be aligned with shifting currents independent of rotation of the spar hull.

23. In a spar structure for offshore hydrocarbon recovery operations comprising:
  a vertically oriented elongated hull, comprising:
    a buoyant upper section; and
    a ballasted lower section;
  a vertically oriented fairing rotatably mounted about the floating hull; and
  an anchoring system connecting the hull to the ocean floor, the anchoring system comprising:
    a plurality of lateral mooring lines, with some of the lateral mooring lines connecting to the fairing in a manner asymmetrical to the axis of the fairing whereby the orientation of the fairing may be aligned with shifting currents independent of rotation of the spar hull.

24. A spar structure in accordance with claim 23 wherein the fairing is a short fairing having a chord to thickness ratio between about 1.5 and 1.20.

25. A spar structure in accordance with claim 23 wherein the fairing is an ultra-short fairing having a chord to thickness ratio between about 1.20 and 1.10.

26. A spar structure in accordance with claim 23 wherein the fairing is substantially neutrally buoyant.

27. A spar structure in accordance with claim 23 wherein the fairing has a net positive buoyancy and further comprising a downwardly directed load shoulder connected circumferentially about the hull directly above the fairing.

28. A spar structure in accordance with claim 27 wherein the anchoring system comprises, a plurality of lateral mooring lines radiating out from the hull from attachment points below the fairing.

29. A spar structure in accordance with claim 23 wherein the fairing has a net negative buoyancy and further comprising an upwardly directed load shoulder connected circumferentially about the hull directly below the fairing.

30. A spar structure in accordance with claim 29 wherein the anchoring system comprises a plurality of lateral mooring lines radiating out from the hull from attachment points above the fairing.

31. A spar structure in accordance with claim 23 wherein the anchor system comprises:
  a foundation secured to the ocean floor; and
  vertically extending risers connecting the hull to the foundation.

32. A spar structure in accordance with claim 31 wherein the risers extend along the exterior of the hull, further comprising a plurality of fairing bushings connected to the hull and projecting outwardly to engage the fairing and prevent contact between the fairing and the risers.

33. A spar structure in accordance with claim 31 wherein the hull of the spar defines a moor pool and the risers extend downwardly from within the moon pool, and further comprising a plurality of low friction pad mounted on the interior of the fairing.

* * * * *